United States Patent
Dehaan et al.

(10) Patent No.: US 8,023,252 B2
(45) Date of Patent: Sep. 20, 2011

(54) PORTABLE ELECTRONIC DEVICE COMPRISING AN INTEGRATED LOCK MECHANISM

(75) Inventors: David Franklin Dehaan, Tucson, AZ (US); Randy Clark Inch, Tucson, AZ (US); Carlos Jacobo Lujan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/235,346

(22) Filed: Sep. 22, 2008

(65) Prior Publication Data

US 2010/0071423 A1 Mar. 25, 2010

(51) Int. Cl.
- *H05K 5/00* (2006.01)
- *H05K 7/00* (2006.01)
- *E05B 73/00* (2006.01)
- *E05B 67/38* (2006.01)

(52) U.S. Cl. .................. 361/679.01; 361/679.57; 70/15; 70/58

(58) Field of Classification Search ............. 361/679.01, 361/679.57; 70/15, 58; 312/223.2; 726/35
See application file for complete search history.

(56) References Cited

U.S. PATENT DOCUMENTS

| | | | |
|---|---|---|---|
| 5,870,281 A * | 2/1999 | Kim | 361/679.57 |
| 6,182,481 B1 * | 2/2001 | Nagy | 70/58 |
| 6,631,201 B1 * | 10/2003 | Dickinson et al. | 382/124 |
| 6,742,366 B1 | 6/2004 | Lai | |
| 7,249,474 B2 | 7/2007 | Avganim | |
| 2004/0177658 A1 | 9/2004 | Mitchell | |
| 2005/0128305 A1 | 6/2005 | Hamasaki et al. | |

* cited by examiner

*Primary Examiner* — Jayprakash N Gandhi
*Assistant Examiner* — Anthony M Haughton
(74) *Attorney, Agent, or Firm* — Dale F. Regelman; Quarles & Brady LLP; Nikia L. Gray

(57) ABSTRACT

An article of manufacture, such as a laptop computer, comprising a housing, a processor disposed within the housing, a computer readable medium disposed within the housing and in communication with the processor, a lock mechanism disposed within the housing, wherein the lock mechanism can be moved between a locked configuration and an unlocked configuration, and computer readable program code encoded in the computer readable medium and useable with the processor, the computer readable program code comprising a series of computer readable program steps to effect moving the lock mechanism between the locked configuration and the unlocked configuration.

19 Claims, 12 Drawing Sheets

US 8,023,252 B2

PORTABLE ELECTRONIC DEVICE COMPRISING AN INTEGRATED LOCK MECHANISM

FIELD OF THE INVENTION

Various embodiments, and combinations thereof, are related to lock mechanisms, more particularly to a lock mechanism for electronic devices, and most particularly to integrated lock mechanisms suitable for securing portable electronic devices or components, such as laptop computers or peripheral devices.

BACKGROUND OF THE INVENTION

The number of electronic devices a person carries is increasing. A business person may utilize a portable computing device, cellular telephone, BLACKBERRY, personal digital assistant, iPOD, digital tape recorder, and the like. At work, that individual may also use a flat screen monitor, and a desktop computer or docking station. All of these items are prime targets for theft due to their small size, easy concealment, and substantial street value. When one is stolen, the owner is not only burdened with replacing an expensive electronic device, but often with the loss of important, and possibly sensitive, data.

A need exists for an apparatus and method to deter theft of such portable electronic devices, wherein that apparatus and method operate electromechanically.

SUMMARY OF THE INVENTION

In one embodiment, an integrated lock mechanism operable in combination with a securing assembly for securing an electronic component to a fixed location is provided. The invention includes an article of manufacture, such as a laptop computer, comprising a housing, a processor disposed within that housing, a computer readable medium disposed within the housing and in communication with the processor, a lock mechanism disposed within the housing, wherein the lock mechanism can be moved between a locked configuration and an unlocked configuration, and computer readable program code encoded in the computer readable medium and useable with the processor, the computer readable program code comprising a series of computer readable program steps to effect moving the lock mechanism between a locked configuration and an unlocked configuration In another embodiment, the invention comprises a computer readable medium comprising computer readable program code disposed therein for securing an electronic device, such as a laptop computer, to a fixed location. The computer readable program code comprises a series of computer readable program steps to effect placing a lock mechanism in a locked orientation upon receipt of one end of a fixturing assembly. In certain embodiments, an opposing end of the fixturing assembly is attached to a furniture object, such as for example a desk, table, work station, and the like. In certain embodiments, an opposing end of the fixturing assembly is attached to a cable where that cable is secured to a furniture object, such as for example a desk, table, work station, and the like.

BRIEF DESCRIPTION OF THE DRAWINGS

Embodiments of the invention will become more apparent from the detailed description set forth below when taken in conjunction with the drawings, in which like elements bear like reference numerals.

DETAILED DESCRIPTION OF THE PREFERRED EMBODIMENTS

Throughout the following description, this invention is described in preferred embodiments with reference to the figures in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' method is graphically set forth herein as a logical flow-chart diagram. As such, the depicted order and labeled steps are indicative of one embodiment of the present method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the block diagram, they are understood not to limit the scope of the corresponding method. Indeed, some arrows or other connectors may be used to indicate only the logical flow of the method. Additionally, the order in which a particular method occurs may or may not strictly adhere to the order of the corresponding steps shown.

FIGS. 1A, 1B, 1C, and 1D, illustrated Applicants' invention in embodiments wherein a portable electronic device comprises a portable computing device. These FIGs. and this description should not be interpreted to limit the invention to portable computing device embodiments. Rather, Applicants' invention may be implemented with any portable electronic device.

Figure 1A:
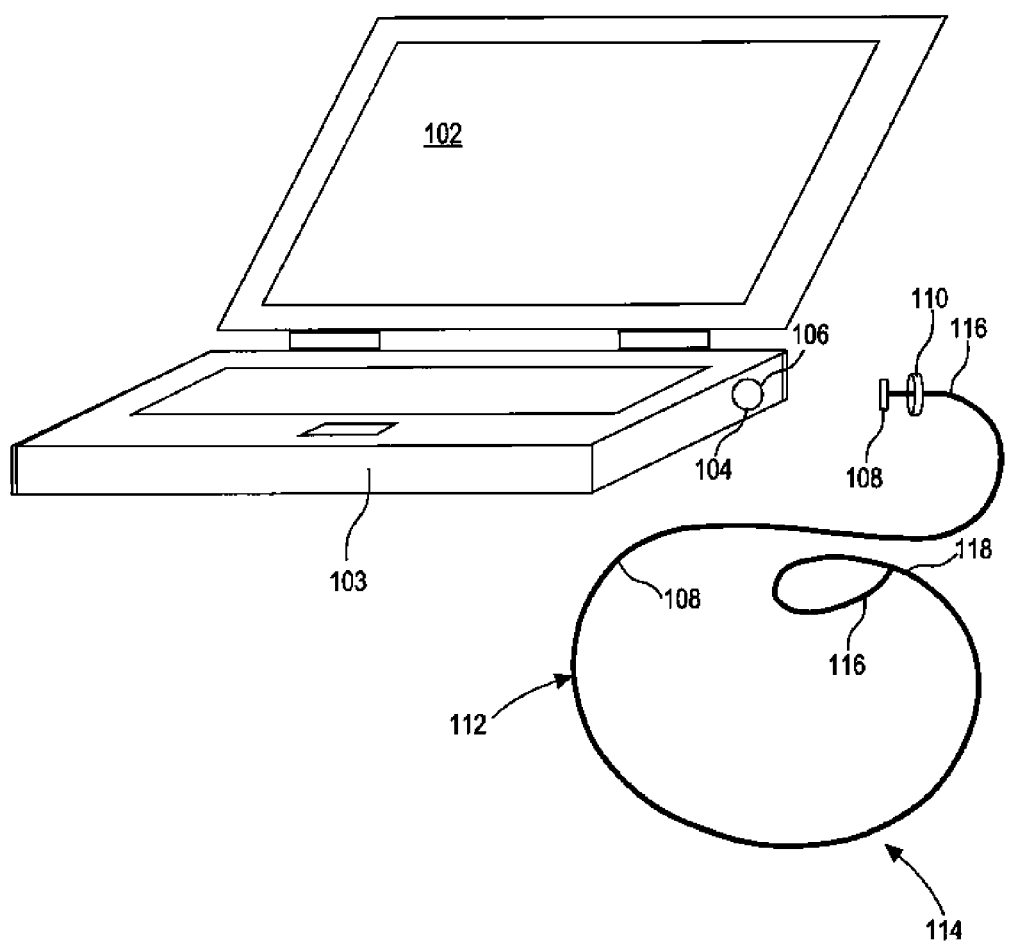
FIGS. 1A-1D illustrate a laptop computer having an integrated lock mechanism operable with a standard locking assembly to secure the laptop computer to a fixed location.
Figure 1B:
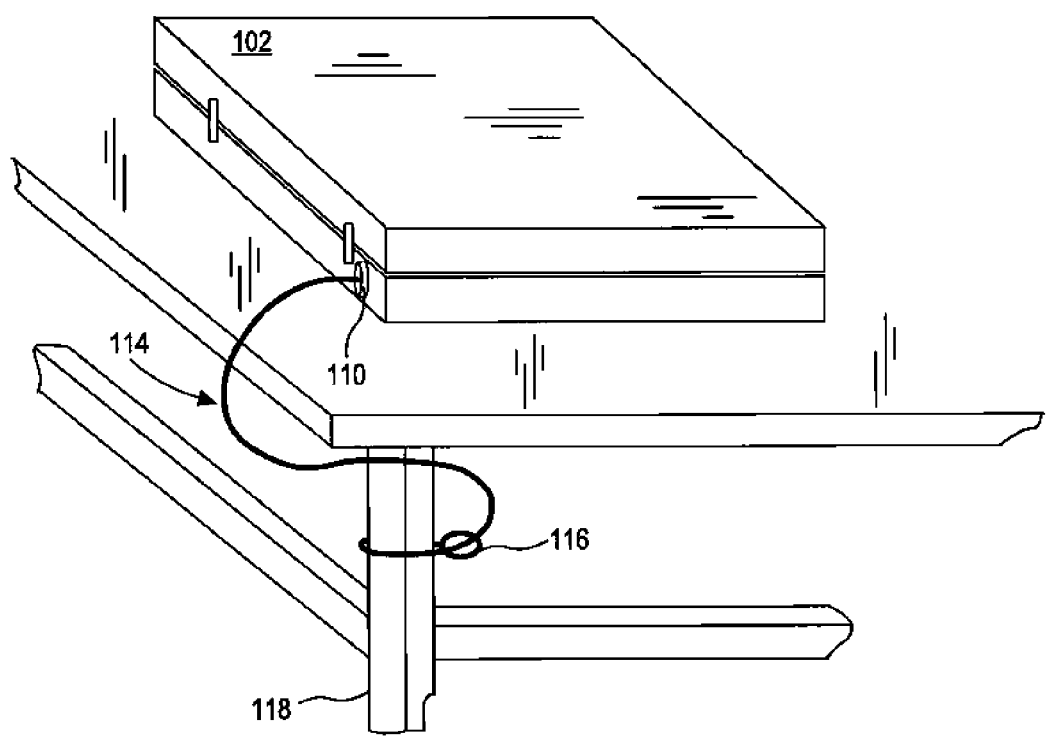
Figure 1C:
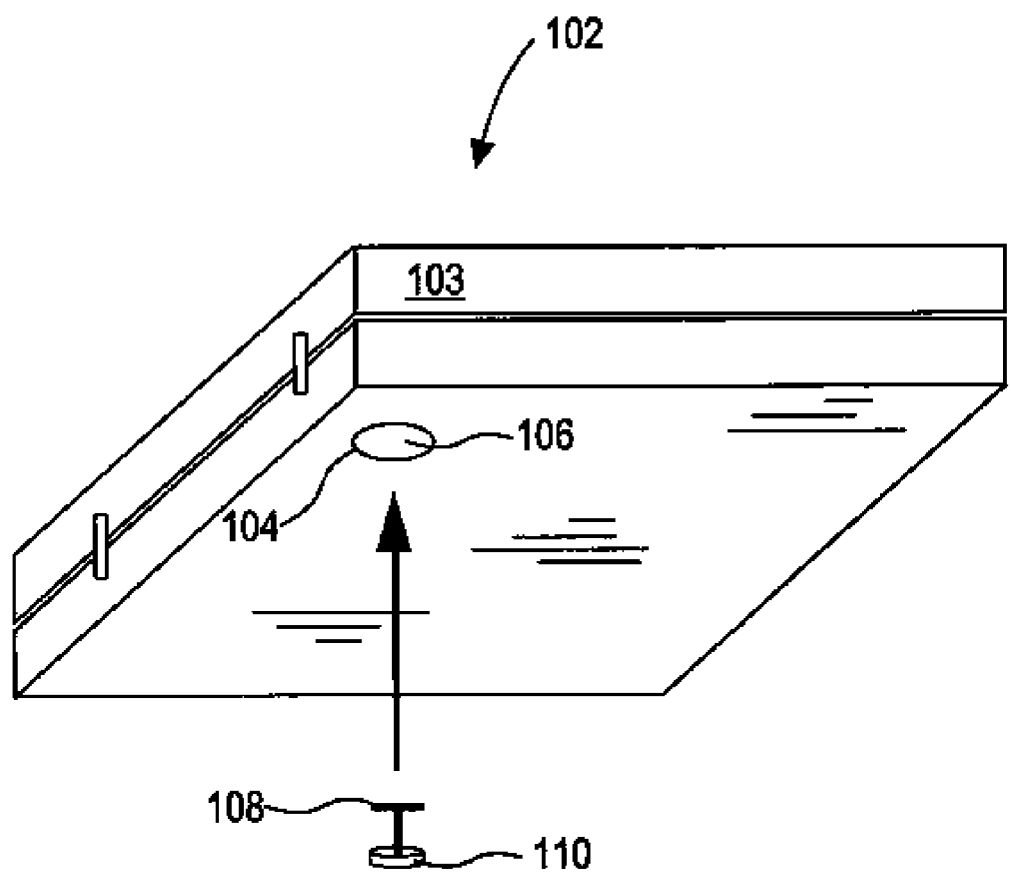
Figure 1D:
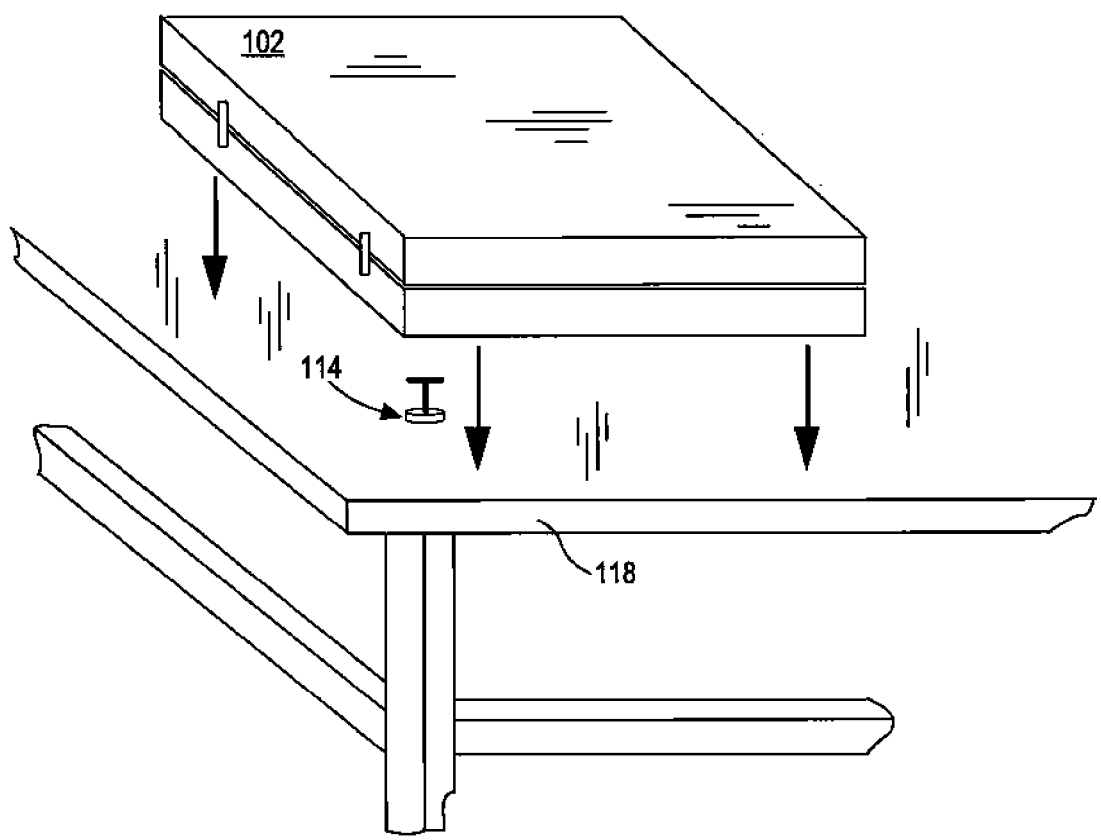

Referring to FIGS. 1A and 1B, FIG. 1A illustrates an electronic device 102, shown as a laptop computer, having an integrated lock mechanism, comprising a security port 104 and a compatible locking assembly 114. Locking assembly 114 comprises a cable 112 having a first end 116 and a second end 118. In the illustrated embodiment of FIG. 1A, locking assembly 114 further comprises a T-shaped fixturing assembly 108 attached to and extending outwardly from first end 116, a cover 110 attached to cable 112 adjacent first end 116, and a loop 116 formed in second end 118.

Although the invention is being illustrated with a laptop computer, it is not limited thereto. In other embodiments, device 102 comprises, without limitation, a BLACKBERRY, cellular telephone, portable digital assistant, tablet PC, desktop computer, display monitor, speakers, IPOD, pager, and the like.

In the illustrated embodiment of FIG. 1A, security port 104 is illustrated as being formed to include an aperture 106 extending therethrough, and into which T-shaped fixturing assembly 108 can be inserted. In other embodiments, housing 103 is formed to include aperture 106 extending therethrough. In certain embodiments, aperture 106 comprises a variety of cross-sectional shapes, such as and without limitation, square, rectangular, triangular, pentagonal, hexagonal, and of irregular shape.

Further in the illustrated embodiment of FIGS. 1A and 1B, locking assembly 114 comprises cover 110. In certain embodiments, cover 110 connects the fixturing assembly 108 to cable 112. In other embodiments, cover 110 contacts the housing of the electronic device 102, thereby defining the distance that locking fixturing assembly 108 can be inserted into the electronic device. In the illustrated embodiment of FIG. 1B, cover 110 blocks physical access to security port 104 when engaged with locking assembly 114. Further in the illustrated embodiment of FIG. 1B, cable 112 is secured to table leg 118 by wrapping cable 112 around the table leg and then through loop 116.

In certain embodiments, cable 112 comprises a plurality of strands of steel fibers. In other embodiments, cable 112 comprises strand aircraft cable in combination with a molded plastic coating.

In certain embodiments, security port 104 is disposed on a bottom surface of electronic device 102. In the illustrated embodiment of FIGS. 1C and 1D, cover 110 is attached to the top surface of table 118 with T-shaped fixturing assembly 108 extending upwardly. In these embodiments, electronic device 102 can be placed on table 118 such that T-shaped fixturing assembly 108 is inserted in aperture 106, thereby securing electronic device 102 to the table 118.

Figure 2A:
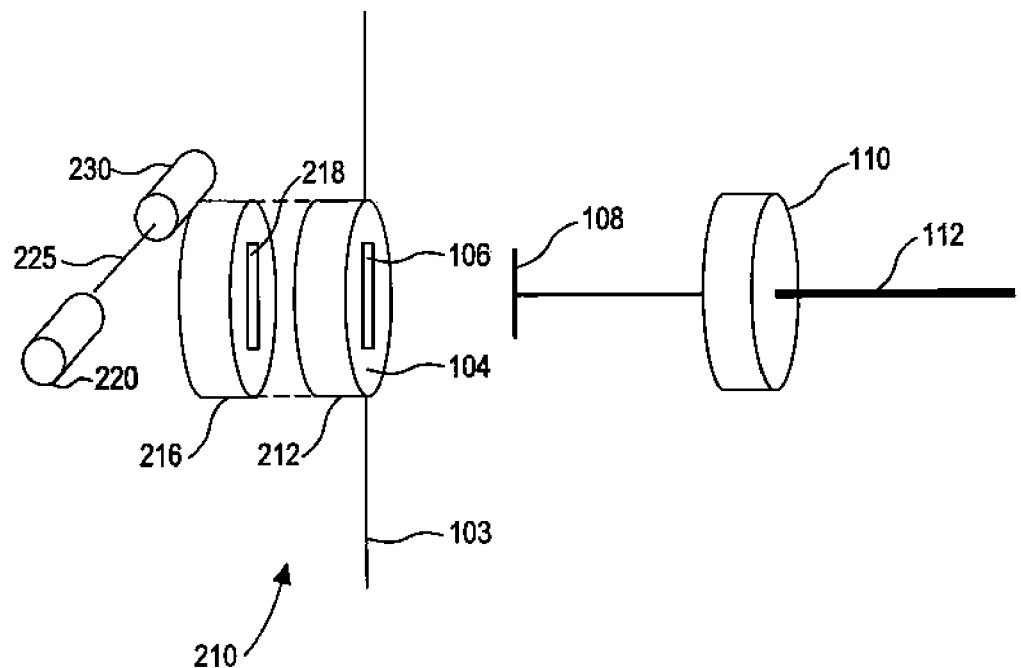
FIGS. 2A and 2B illustrate an exploded view of an exemplary embodiment of Applicants' lock mechanism in an unlocked configuration.

In the illustrated embodiment of FIG. 2A, lock mechanism 210 comprises two cylindrical members 212 and 216, each formed to include an aperture extending therethrough. Aperture 106 extends through member 212 and aperture 218 extends through member 216. Referring now to FIGS. 1A and 2A, surface 104 of member 212 is visible from the outside of the electronic device, the rest of cylinder 212 and all of member 216 being disposed within device 102. In the present embodiment, apertures 214 and 218 comprise rectangular cross-sections. In other embodiments, apertures 214 and 218 may comprise any configuration that allows fixturing assembly 108, here illustrated as being T-shaped, to be inserted therethrough. In certain embodiments, apertures 214 and 218 may comprise different shapes. In addition, in certain embodiments members 212 and/or 216 may comprise a shape selected from the group consisting of a square, rectangle, triangle, pentagon, hexagon, an irregular shape, and the like.

When lock mechanism 210 is disposed in an unlocked configuration of FIG. 2A, apertures 214 and 218 are aligned, allowing fixturing assembly 108 to be inserted or removed. By "aligned," Applicants mean that at least ninety percent (90%) of aperture 216 can be seen through aperture 106.

In the illustrated embodiment of FIG. 2A, lock mechanism 210 further comprises a detector. In the illustrated embodiment of FIG. 2A, that detector comprises electromagnetic radiation source 220 and electromagnetic radiation detector 230.

Figure 2B:
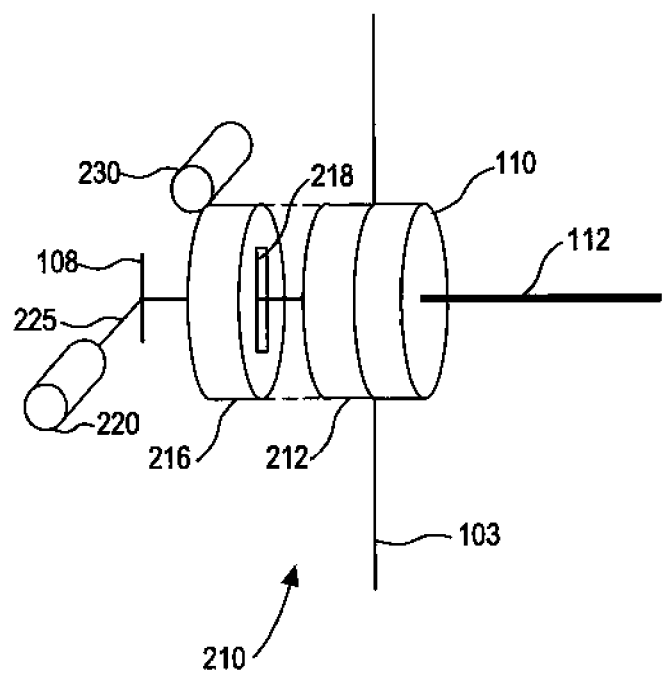

Referring now to. FIG. 2B, fixturing assembly 108 has been inserted through apertures 214 and 218 of members 212 and 216. Fixturing assembly 108 blocks beam 225 such that the irradiation emitted by device 220 does not reach detector 230, thereby indicating that fixturing assembly 108 has been properly inserted, and lock mechanism 210 can be moved to a locked configuration. In other embodiments, radiation emitter 220 and detector 230 can be replaced with a contact switch, such that a distal end of fixturing assembly 108 moves that contact switch from a first position to a second position thereby indicating that fixturing assembly 108 has been properly inserted, and lock mechanism 210 can be moved to a locked configuration.

Figure 3A:
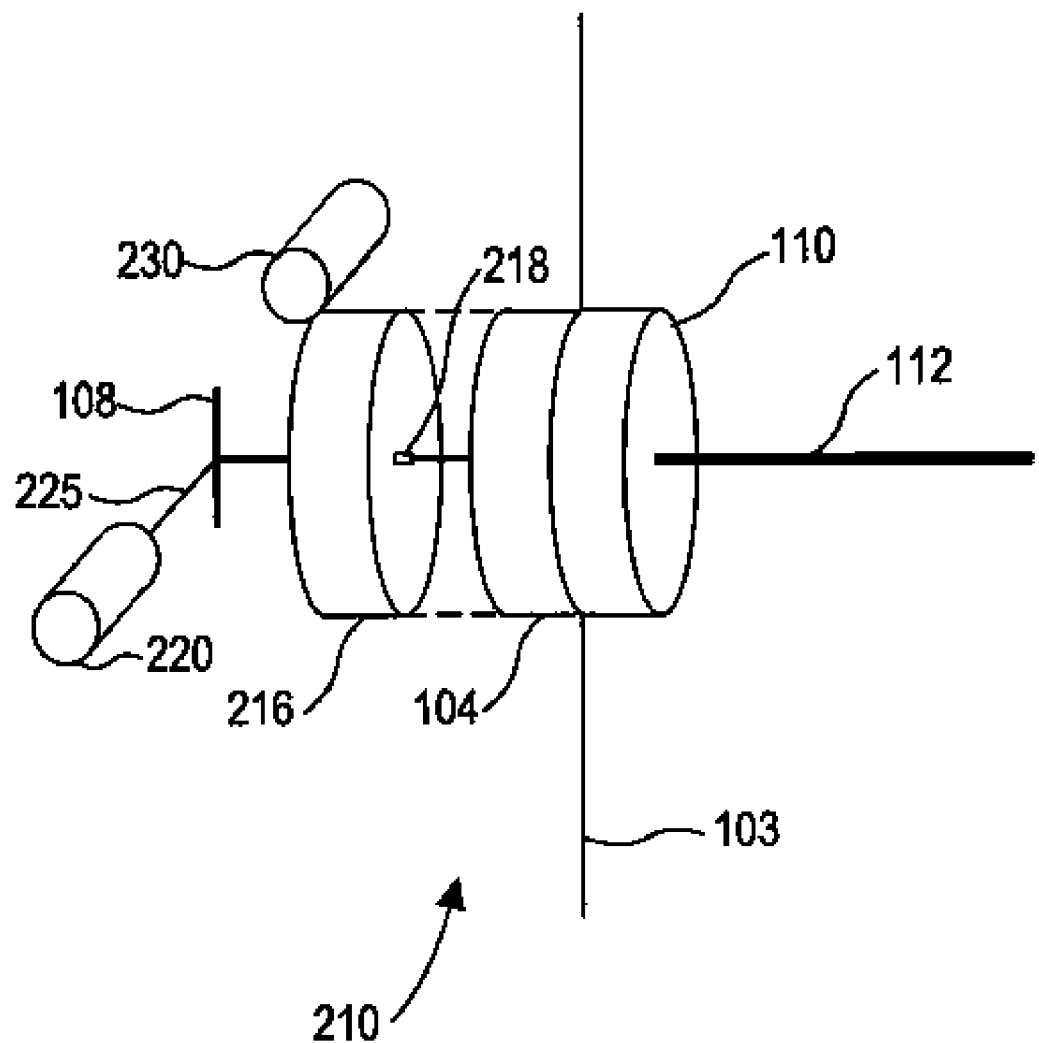
FIGS. 3A, 3B, 3B, illustrate an exploded view of an exemplary embodiment of Applicants' lock mechanism in a locked configuration.

Referring now to FIG. 3A, lock mechanism is shown in a locked orientation wherein aperture 214 of member 212 is not aligned with aperture 218 of member 216. By "not aligned," Applicants mean that less than twenty-five percent (25%) of aperture 216 can be seen through aperture 106.

Figure 3B:
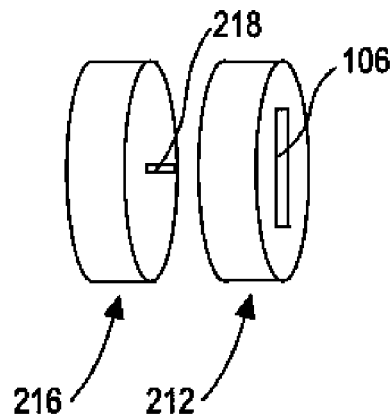
Figure 3C:
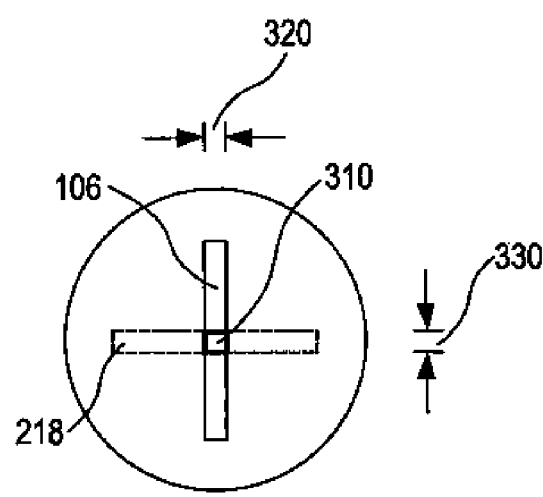

Referring now to FIGS. 3B and 3C, in FIG. 3B apertures 106 and 218 are shown orthogonal to one another, i.e. "not aligned." Referring to FIG. 3C, aperture 106 comprises a width 320, and aperture 218 comprises a width 330. When members 212 and 216 are disposed in the orientations shown in FIGS. 3A, 3B, and 3C, i.e. when lock mechanism 210 is placed in a locked configuration, an aggregate aperture 310 is formed by apertures 106 and 218. That aggregate aperture 310 comprises an area defined by the multiplication product of width 320 and width 330. For example, if width 320 and width 330 equal 0.5 inch, then aggregate aperture 310 comprises an area of 0.25 inch.

Fixturing assembly may comprise a variety of shapes. As long as every orientation of fixturing assembly comprises an effective surface area greater than 0.25 inches, then that fixturing assembly would be "locked" when aperture 106 is placed orthogonal to aperture 218.

When lock mechanism 210 is disposed in the locked configuration of FIGS. 3A, 3B, and 3C, fixturing assembly 108 cannot be removed from security port 104.

Figure 4:
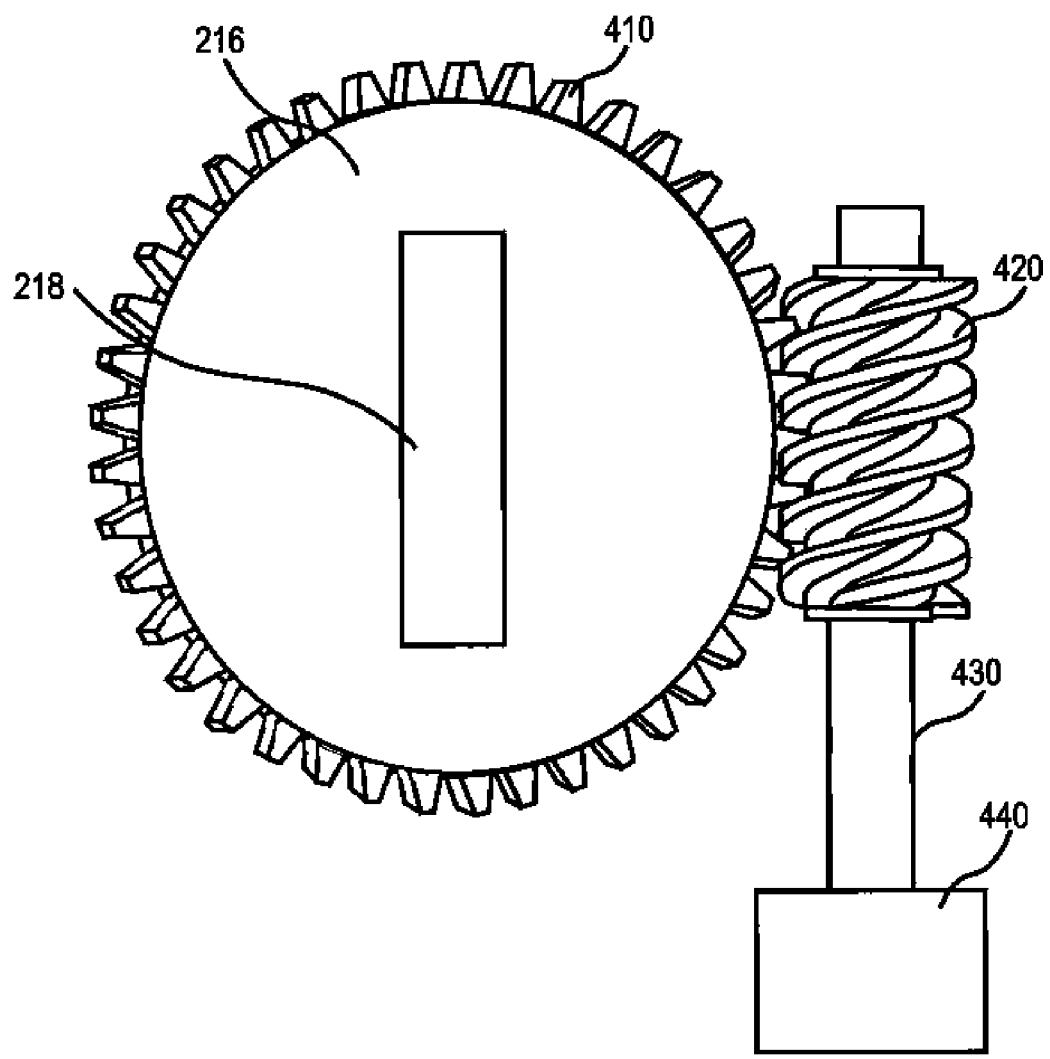
FIG. 4 illustrates one embodiment of a rotatable lock member element of the lock mechanism of FIGS. 2A, 2B, 3A, 3B, and 3C.

Referring now to FIG. 4, in certain embodiments member 218 is rotated to place lock mechanism into the locked configuration of FIGS. 3A, 3B, and 3C. In the illustrated embodiment of FIG. 4, member 216 comprises a plurality of gear teeth 410 disposed along its periphery. That plurality of gear teeth intermesh with worm gear 420. Worm gear 420 in disposed on a rotatable shaft 430 which extends outwardly from motor 440. Motor 440 can be energized to rotate shaft 430, worm gear 420, and member 216.

In certain embodiments, the rotation of member 216 is caused by a stepper motor. In other embodiments, an actuator may be used. In yet other embodiments, the rotation may be caused by a piezoelectric actuator, a solenoid, or any other suitable apparatus.

In other embodiments, member 216 can be linearly moved upwardly or downwardly, rather than rotated, from the position in FIG. 2A thereby progressively diminishing the area of aggregate aperture 310, and preventing removal of fixturing assembly 108 from security port 104. In certain embodiments, a distance between cover 110 and a distal end of fixturing assembly 108 is adjustable. In these embodiments, connector 204 can be adjusted, independent of the manufacturer or type of electronic device, such that cover 110 contacts housing 103 of device 102 thereby deterring access to security port 104.

In certain embodiments the locking of security port 210 is triggered by the insertion of fixturing assembly 108 into security port 104. In other embodiments, lock mechanism 210 moves to a locked configuration upon the receipt of a locking request.

Figure 5:
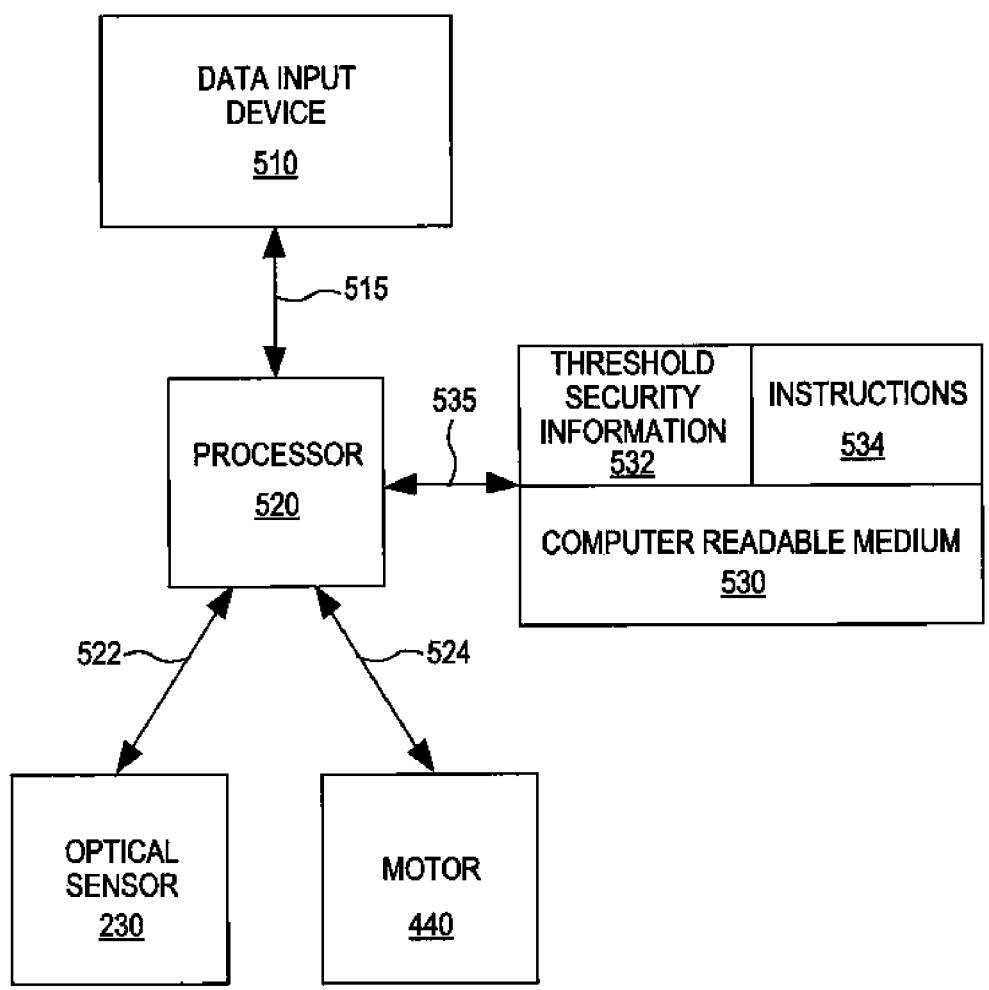
FIG. 5 is a block diagram showing certain electromechanical elements disposed within Applicants' electronic device.

Referring now to FIG. 5, in certain embodiments device 102 comprises, or is in communication with, a data input device 510, a processor 520, a computer readable medium 530, an optical sensor 230, and a motor 440. In certain embodiments, optical sensor 230 is replaced with a contact switch. Processor 520 is interconnected with data input device 510 via communication link 515. Processor 535 is interconnected to computer readable medium 530 via communication link 535. Processor 520 is interconnected with optical sensor/contact switch 230 via communication link 522. Processor 520 is interconnected to motor 440 via communication link 524.

In certain embodiments, data input device is integral with electronic device 102. In other embodiments, data input device 510 is remote from electronic device 102, wherein data input device 510 is not disposed within housing 103. In certain embodiments, communication link 515 may utilize any 110 protocol, including without limitation one or more of, serial, ESCON, FICON, Fibre Channel, INFINIBAND, Gigabit Ethernet, Ethernet, TCP/IP, iSCSI, SCSI I/O interface, and the like.

In certain embodiments, computer readable medium 530 is integral with electronic device 102. In other embodiments, computer readable medium 530 is remote from electronic device 102, wherein computer readable medium 530 is not disposed within housing 103. In certain embodiments, communication link 535 may utilize any I/O protocol, including without limitation one or more of, serial, ESCON, FICON, Fibre Channel, INFINIBAND, Gigabit Ethernet, Ethernet, TCP/IP. iSCSI, SCSI I/O interface, and the like.

Figure 7:
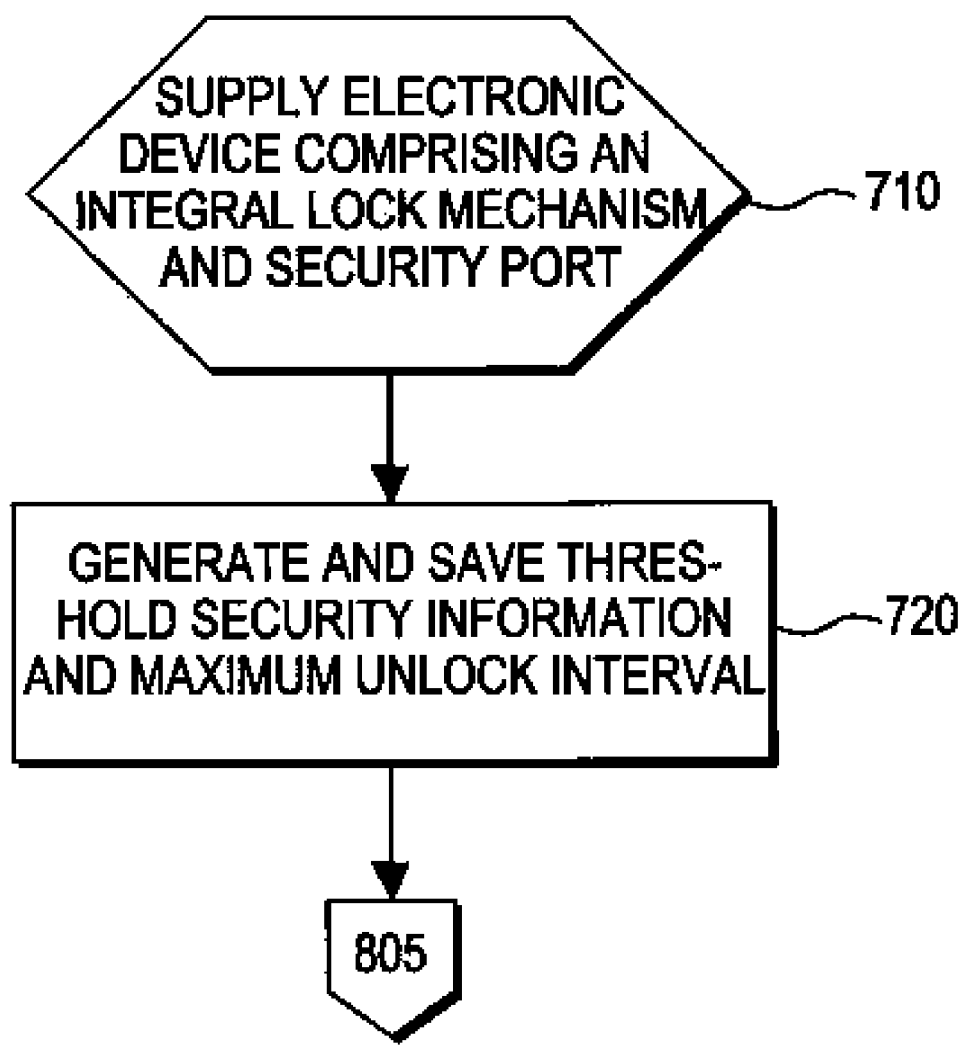
FIG. 7 is a flow chart summarizing certain initial steps of Applicants' method.

Referring now to FIG. 7, in step 710 the method supplies an electronic device comprising an integral lock mechanism, such as for example lock mechanism 210, and a security port, such as for example security port 104.

In step 720, the method generates and saves Threshold Security Information and optionally a Maximum Unlock Interval. In certain embodiments, the Threshold Security Information of step 710 comprises a password. In certain embodiments, the Threshold Security Information of step 710 comprises a password. In certain embodiments, the password is accompanied by a user name. In some embodiments, several passwords and username/password combinations may be accepted. In such an embodiment, a system administrator can place lock mechanism 210 in an unlocked configuration of FIGS. 2A and 2B in the event an employee forgets his/her password, or if employment is terminated without the employee disclosing a password.

Figure 6:
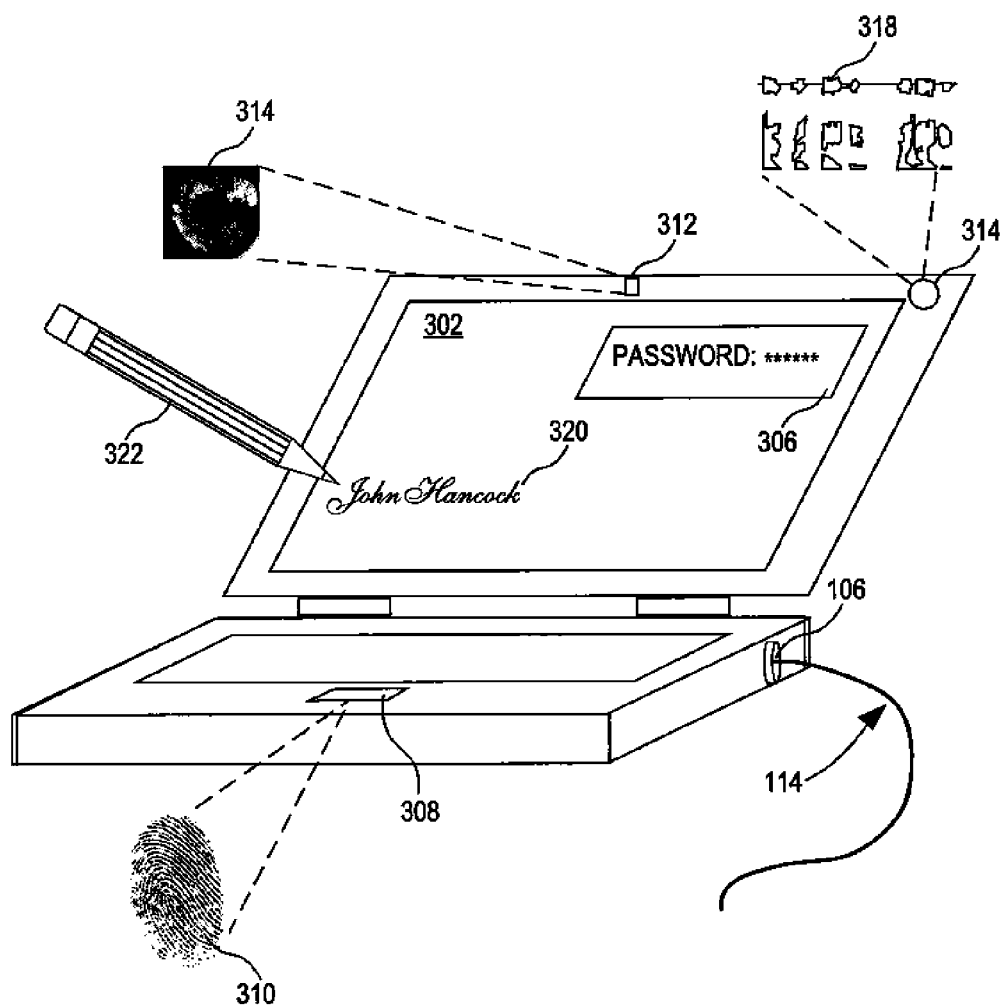
FIG. 6 illustrates an embodiment of a laptop computer comprising a plurality of data input devices.

In certain embodiments wherein more secure methods of confirming user identity are desired, the security information of step 720 comprises a fingerprint. For example in the illustrated embodiment of FIG. 6, device 302 comprises a fingerprint scanner 308. In these embodiments, fingerprint scanner 308 comprises data input device 510. As those skilled in the art of biometrics will appreciate, each human fingertip has a unique patter of ridges and valleys caused by both genetic factors and environmental factors when a fetus is developing. Fingerprints are therefore a unique marker for every individual.

In certain embodiments, fingerprint scanner 308 may employ an optical scanning method. Fingerprint scanner 208 may comprise a charge coupled device (CCD) camera having photosites to record representations of light that hit the photosite. Fingerprint scanner 208 may also include an analog-to-digital converter to process the analog electric signal created by the CCD to generate a digital representation of the scanned fingerprint.

When a finger is placed on a glass plate, the CCD camera takes a picture, the fingerprint scanner having an internal light source to illuminate the ridges of the finger. In some embodiments, a processor incorporated into fingerprint scanner 208 may determine whether the image, here shown as fingerprint image 310, captured by the CCD camera is suitable. If it is not, the scanner may reject image 310 and perform the scan again. The processor may check both the overall light level as well as the definition. Once image 310 has been accepted, that image is encoded in computer readable medium 530 as Threshold Security Information 532.

In other embodiments, fingerprint scanner 308 may use a capacitance scanning method. In this method, an image 310 of the ridges and valleys that make up the fingerprint is generated. Here, however, capacitors are used to sense electronic current. In this embodiment, fingerprint scanner 308 may include a sensor made up of several semiconductor chips and connected to an integrator having an inverting operation amplifier. To obtain image 310, the inverting amplifier is connected to a feedback loop that is connected to two conductor plates. These conductor plates form a basic capacitor, with the surface of the finger acting as another capacitor plate.

To scan the finger, the processor applies a charge to the integrator circuit and charges up the capacitors. The ridges and valleys in the finger result in different voltage outputs which can be read and put together to create finger print image 310.

Once image 310 is obtained, that image is encoded in computer readable medium 530 as Threshold Security Information 532.

In other embodiments, the information of step 720 comprises an iris scan and/or a retinal scan. In the illustrated embodiment of FIG. 6, device 102 comprises an iris scanner 312. In certain embodiments, iris scanner 312 comprises a CCD camera. A high-contrast image 314 of a user's iris is generated using both visible and near-infrared light. This iris/retinal image is encoded in computer readable medium 530 as Threshold Security Information 532.

In yet other embodiments, the information of step 720 comprises a voiceprint. In these embodiments, electronic device 302 comprises a microphone. In certain embodiments, a user recites an exact word or phrase to identify themselves. In other embodiments, the user may give an extended speech exemplar. Processor 520 uses the voiceprint to create a spectrograph 318. Spectrograph 318 is encoded in computer readable medium 530 as Threshold Security Information 532.

In yet other embodiments, the information of step 720 comprises a handwriting exemplar. In the illustrated embodiment of FIG. 6, a user employs a stylus 322 to write a signature 320 on a touch sensitive surface. In certain embodiments, the information of step 720 comprises the shape of each letter. In other embodiments, the information of step 720 further comprises the pressure exerted, in combination with the speed and rhythm in which the user writes. In certain embodiments, the information of step 720 further comprises a sequence in which letters are formed, for example whether dots or crosses are added before or after the word is finished. The handwriting exemplar 320, in optional combination with other parameters, is encoded in computer readable medium 530 as Threshold Security Information 532.

In other embodiments, the information of step 720 may comprise other forms of authentication such as retinal scans, vein recognition, hand and finger geometry, or other form of authentication or identification, and combinations thereof.

Figure 8:
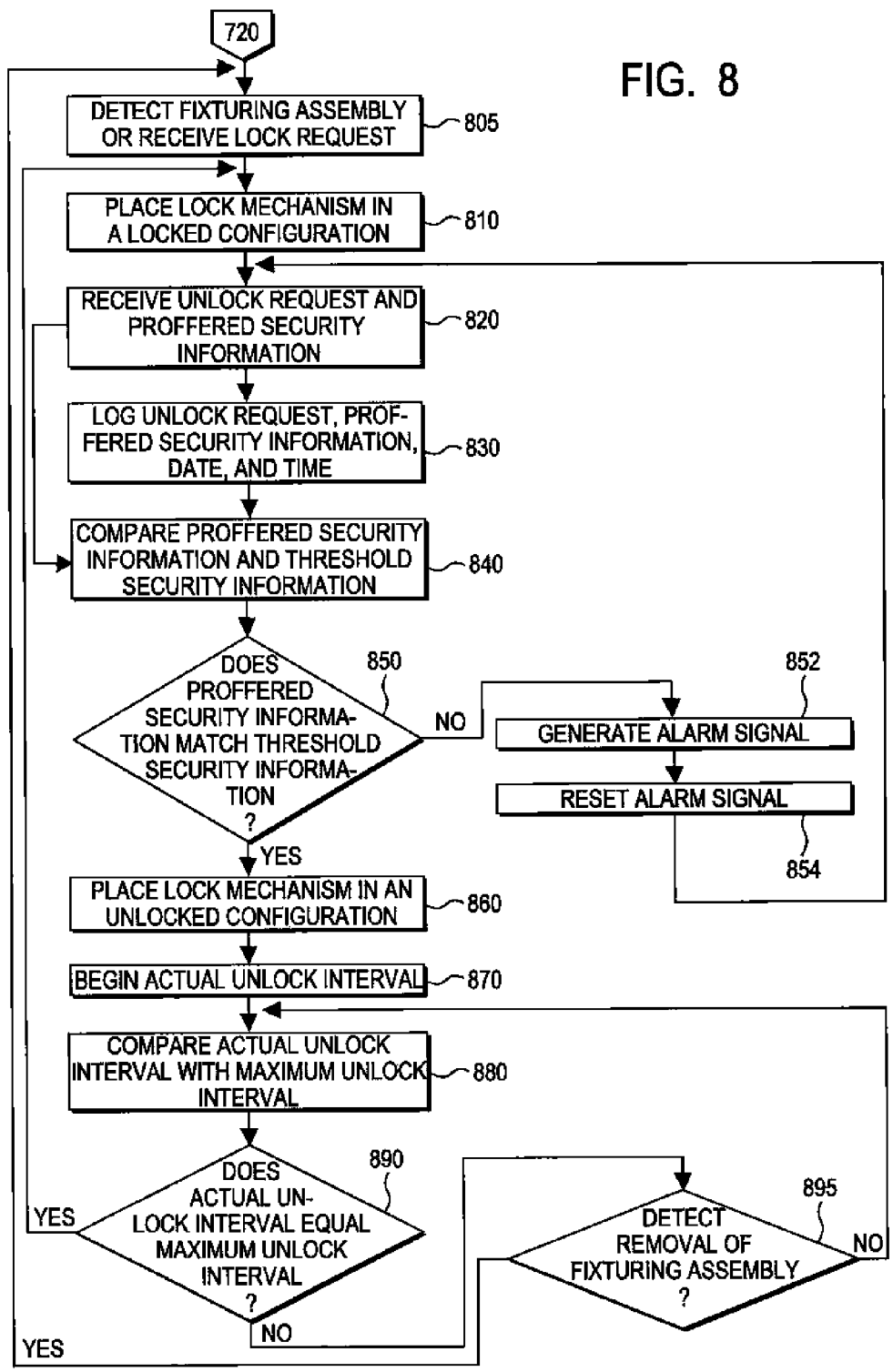
FIG. 8 is a flow chart summarizing certain additional steps of Applicants' method.

FIG. 8 summarizes Applicants' method to lock and unlock Applicants' electronic device. As described herein, Applicants' electronic device comprises a lock mechanism wherein when a plurality of apertures are aligned the lock mechanism comprises an unlocked configuration, and when the plurality of apertures are not aligned the lock mechanism comprises a locked configuration.

Referring now to FIG. 8, in step 805 the method detects a fixturing assembly, such as fixturing assembly 108, disposed in a lock mechanism portion of the electronic device of step 710, such as lock mechanism 210. In certain embodiments, optical sensor 230 provides a signal to processor 520, wherein that signal indicates that optical sensor 230 does not detect emissions from device 220. In certain embodiments, step 805 is performed by a processor disposed in the electronic device of step 710. In certain embodiments, step 805 is performed by a contact switch disposed a lock mechanism, such as lock mechanism 210.

In certain embodiments, step 805 comprises receiving an unlock command by processor 520. In certain embodiments, that unlock command is provided by data input device 510. In certain embodiments, that data input device comprises a keyboard, touch screen, microphone, iris scanner, finger print scanner, retina scanner, and the like.

In step 810, the method places a lock mechanism, such as lock mechanism 210, in a locked configuration, such as the locked configuration of FIGS. 3A, 3B, and 3C. In certain embodiments, step 810 is performed by a processor disposed in the electronic device of step 710. In certain embodiments, step 810 comprises energizing a motor, such as motor 440, to rotate a member, such as member 218, such that a first aperture, such as aperture 106, is not aligned with a second aperture, such as aperture 218.

In step 820, the method provides an unlock request in combination with Proffered Security Information. In certain embodiments, the Proffered Security Information of step 820 comprises a password. In certain embodiments, the Proffered Security Information of step 820 comprises a user name. In certain embodiments, the Proffered Security Information of step 820 comprises a fingerprint image. In certain embodiments, the Proffered Security Information of step 820 comprises an iris image. In certain embodiments, the Proffered Security Information of step 820 comprises a retinal image. In certain embodiments, the Proffered. Security Information of step 820 comprises a handwriting exemplar. In certain embodiments, the Proffered Security Information of step 820 comprises a voice print.

In certain embodiments, Applicants' method includes step 830. In step 830, the method logs a date and time the unlock request of step 820 was received. In certain embodiments, in step 830 the method logs the Proffered Security information of step 820.

In step 840, the method compares the Proffered Security Information of step 820 with the Threshold Security Information of step 720. In certain embodiments, step 820 is performed by a processor disposed in the electronic device of step 710. In certain embodiments, in step 820 a processor disposed in the electronic device of step 710 retrieves encoded Threshold Security Information 532 from a computer readable medium 530 disposed in the electronic device of step 710. In certain embodiments, step 820 is performed by a computing device external to, but in communication with, the electronic device of step 710.

In step 850, the method determines if the Proffered Security Information of step 820 matches the Threshold Security Information of step 720. In certain embodiments, step 850 is performed by a computing device disposed in the electronic device of step 710. In certain embodiments, step 850 is performed by a computing device external to, but in communication with, the electronic device of step 710.

In certain embodiments, if the Proffered Security Information of step 820 is 95% or greater identical to the Threshold Security Information of step 720, then the method determines that the Proffered Security Information of step 820 matches the Threshold Security Information of step 720. In certain embodiments, if the Proffered Security Information of step 820 is 75% or greater identical to the Threshold Security Information of step 720, then the method determines that the Proffered Security Information of step 820 matches the Threshold Security Information of step 720. In certain embodiments, if the Proffered Security Information of step 820 is 50% or greater identical to the Threshold Security Information of step 720, then the method determines that the Proffered Security Information of step 820 matches the Threshold Security Information of step 720.

If the method determines in step 850 that the Proffered Security Information of step 820 does not match the Threshold Security Information of step 720, then the method transitions from step 850 to step 852 wherein the method generates an alarm signal. In certain embodiments, the alarm signal of step 852 comprises a text message that is displayed on a visual display device integral with the electronic device of step 710. In certain embodiments, the alarm signal of step 852 comprises a text message that is displayed on a visual display device external to, but in communication with, the electronic device of step 710.

In certain embodiments, the alarm signal of step 852 comprises an audible message that is emitted from the electronic device of step 710. In certain embodiments, the alarm signal of step 852 comprises an audible message that is emitted from an electronic device external to, but in communication with, the electronic device of step 710.

The method transitions from step 852 to step 854 wherein the method resets the alarm signal of step 852. In certain embodiments, step 854 must be performed manually by a user that enters Proffered Security Information that matches Threshold Security Information. The method transitions from step 854 to step 820 and continues as described herein.

If the method determines in step 850 that the Proffered Security Information of step 820 does match the Threshold Security Information of step 720, then the method transitions from step 850 to step 860 wherein the method places the lock mechanism disposed in the electronic device of step 710 in an unlocked configuration. In certain embodiments, the method in step 860 places lock mechanism 210 in the configuration of FIG. 2A. In certain embodiments, step 860 is performed by a processor disposed in the electronic device of step 710. In certain embodiments, step 860 comprises energizing a motor, such as motor 440, to rotate a member, such as member 218, such that a first aperture, such as aperture 106, is aligned with a second aperture, such as aperture 218.

In step 870, the method begins an Actual Unlock interval, wherein that Actual Unlock Interval comprises a time interval beginning with step 860 up to a current time. In certain embodiments, step 870 is performed by a processor disposed in the electronic device of step 710. In certain embodiments, step 870 is performed by a processor external to, but in communication with, the electronic device of step 710.

In step 880, the method compares the Actual Unlock Interval of step 870 with the Maximum Unlock Interval of step 710. In certain embodiments, step 870 is performed by a computing device disposed in the electronic device of step 710. In certain embodiments, step 870 is performed by a computing device external to, but in communication with, the electronic device of step 710.

In step 890, the method determines if the Actual Unlock Interval of step 870 equals the Maximum Unlock Interval of step 710. In certain embodiments, step 890 is performed by a computing device disposed in the electronic device of step 710. In certain embodiments, step 890 is performed by a computing device external to, but in communication with, the electronic device of step 710.

If the method determines in step 890 that the Actual Unlock Interval of step 870 equals the Maximum Unlock Interval of step 710, then the method transitions from step 890 to step 810 and continues as described herein.

If the method determines in step 890 that the Actual Unlock Interval of step 870 does not equal the Maximum Unlock Interval of step 710, then the method transitions from step 890 to step 895 wherein the method determines if removal of the fixturing device of step 805 is detected. In certain embodiments, step 895 is performed by a computing device disposed in the electronic device of step 710. In certain embodiments, step 895 is performed by a computing device external to, but in communication with, the electronic device of step 710.

If the method determines in step 895 that removal of the fixturing device of step 805 is detected, then the method transitions from step 895 to step 805 and waits to detect the insertion of a fixturing device into a lock mechanism.

If the method determines in step 895 that removal of the fixturing device of step 805 is not detected, then the method transitions from step 895 to step 880 and continues as described herein.

In certain embodiments, individual steps recited in FIGS. 7 and/or 8 may be combined, eliminated, or reordered.

In certain embodiments, step 720 recited in FIG. 7, and/or one or more of steps 805, 810, 820, 830, 840, 850, 852, 854, 860, 870, 880, 890, and/or 895, recited in FIG. 8, may be performed by a processor, such as processor 520, using instructions, such as instructions 534, encoded in a computer readable medium, such as computer readable medium 530. In other embodiments, the inventions comprises instructions encoded in a computer program product, where those instructions are executed by a computer external to the electronic device of step 710, to perform one or more of the steps recited in FIG. 4. In either case, the instructions may be encoded in computer readable medium comprising, for example, a magnetic information storage medium, an optical information storage medium, an electronic information storage medium, and the like. "Electronic storage media" may mean, for example and without limitation, one or more devices, such as and without limitation, a PROM, EPROM, EEPROM, Flash PROM, compactflash, smartmedia, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An article of manufacture, comprising:
   a housing;
   a processor disposed within said housing;
   a computer readable medium disposed within said housing and in communication with said processor;
   a lock mechanism disposed within said housing, wherein said lock mechanism can be moved between a locked configuration and an unlocked configuration;
   wherein said lock mechanism comprises:
   a first member formed to include a first aperture;
   a second member formed to include a second aperture, said second member is moveably disposed within said portable electronic device;
   wherein said second member is rotatably disposed within said article of manufacture, and wherein said second member comprises a periphery and a plurality of gear teeth disposed on said periphery;
   a motor in communication with said processor;
   a rotatable shaft extending outwardly from said motor;
   a worm gear disposed around said rotatable shaft, wherein said worm gear intermeshes with one or more of said plurality of gear teeth;
   computer readable program code encoded in said computer readable medium and useable with said processor, the computer readable program code comprising a series of computer readable program steps to effect:
   energizing said motor;
   rotating said second aperture to a locked configuration wherein said first aperture is not aligned with said second aperture.

2. The article of manufacture of claim 1, wherein said article of manufacture comprises a portable computing device.

3. The article of manufacture of claim 1, said computer readable program code further comprising a series of computer readable program steps to effect:
   detecting insertion of a fixturing assembly into said lock mechanism;
   moving said lock mechanism to a locked configuration, wherein said fixturing assembly cannot be removed from said lock mechanism.

4. The article of manufacture of claim 3, wherein said fixturing assembly comprises a proximal end and a distal end, and wherein said proximal end is attached to a furniture object, and wherein said computer readable program code to detect insertion of a fixturing assembly further comprises a series of computer readable program steps to effect detecting insertion of said distal end of said fixturing assembly.

5. The article of manufacture of claim 4, wherein said proximal end of said fixturing assembly is attached to a first end of a cable.

6. The article of manufacture of claim 5, wherein said cable is formed to include a loop at a second end.

7. The article of manufacture of claim 3, said computer readable program code further comprising a series of computer readable program steps to effect:
   receiving Threshold Security Information;
   saving said Threshold Security Information in said computer readable medium.

8. The article of manufacture of claim 7, said computer readable program code further comprising a series of computer readable program steps to effect:
- receiving Proffered Security Information;
- determining if said Proffered Security Information matches said Threshold Security Information;
- operative if said Proffered Security Information matches said Threshold Security Information, placing said lock mechanism in said unlocked configuration.

9. The article of manufacture of claim 8, further comprising a data input device in communication with said processor, wherein said computer readable program code to receive Proffered Security Information further comprises a series of computer readable program steps to effect receiving said Proffered Security Information from said data input device.

10. The article of manufacture of claim 9, wherein said data input device is selected from the group comprising a dialog box to receive a password, a fingerprint scanner, an iris scanner, a voiceprint receiver, and a touch pad surface to receive a handwriting exemplar.

11. A computer program product encoded in a computer readable medium disposed within an electronic device comprising:
- a housing;
- a programmable processor disposed within said housing;
- a lock mechanism disposed within said housing, wherein said lock mechanism can be moved between a locked configuration and an unlocked configuration;
- wherein said lock mechanism comprises:
- a first member formed to include a first aperture;
- a second member formed to include a second aperture, said second member is moveably disposed within said portable electronic device;
- wherein said second member is rotatably disposed within said article of manufacture, and wherein said second member comprises a periphery and a plurality of gear teeth disposed on said periphery;
- a motor in communication with said processor;
- a rotatable shaft extending outwardly from said motor;
- a worm gear disposed around said rotatable shaft, wherein said worm gear intermeshes with one or more of said plurality of gear teeth;
- computer readable program code which causes said programmable processor to energize said motor;
- computer readable program code which causes said programmable processor to rotate said second aperture to a locked configuration wherein said first aperture is not aligned with said second aperture.

12. The computer program product of claim 11, further comprising:
- computer readable program code which causes said programmable processor to detect insertion of a fixturing assembly into said lock mechanism;
- computer readable program code which causes said programmable processor to move said lock mechanism to a locked configuration, wherein said fixturing assembly cannot be removed from said lock mechanism.

13. The computer program product of claim 12, wherein said fixturing assembly comprises a proximal end and a distal end, and wherein said proximal end is attached to a furniture object.

14. The computer program product of claim 12, wherein said proximal end is attached to a cable.

15. The computer program product of claim 12, further comprising:
- computer readable program code which causes said programmable processor to receive Threshold Security Information;
- computer readable program code which causes said programmable processor to save said Threshold Security Information in said computer readable medium.

16. The computer program product of claim 15, further comprising:
- computer readable program code which causes said programmable processor to receive Proffered Security Information;
- computer readable program code which causes said programmable processor to determine if said Proffered Security Information matches said Threshold Security Information;
- computer readable program code which, if said Proffered Security Information matches said Threshold Security Information, causes said programmable processor to move said lock mechanism to said unlocked configuration.

17. The computer program product of claim 16, further comprising:
- computer readable program code which, if said Proffered Security Information does not match said Threshold Security Information, causes said programmable processor to:
- generate an alarm signal; and
- log said Proffered Security Information in said computer readable medium.

18. The computer program product of claim 16, wherein said electronic device further comprises a data input device in communication with said processor, wherein said computer readable program code which causes said programmable processor to receive Proffered Security Information further comprises computer readable program code which causes said programmable processor to receive said Proffered Security Information from said data input device.

19. The computer program product of claim 18, wherein the input device is selected from the group comprising a dialog box to receive a password, a fingerprint scanner, an iris scanner, a voiceprint receiver, and a touch pad surface to receive a handwriting exemplar.

* * * * *